June 8, 1965  R. W. HILL  3,187,551
AUTOMATIC METER PROVER
Filed Aug. 17, 1961  3 Sheets-Sheet 1
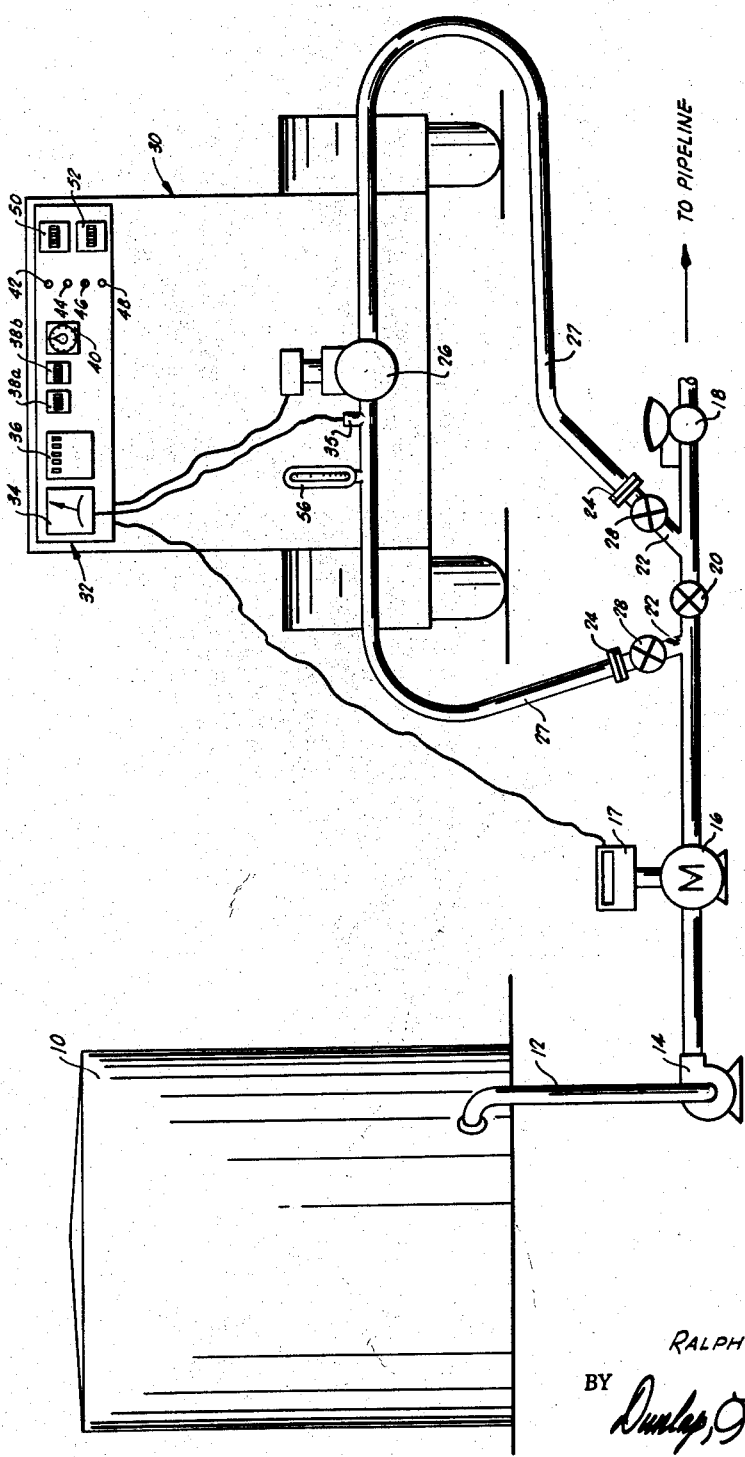
INVENTOR.
RALPH W. HILL
BY
ATTORNEYS

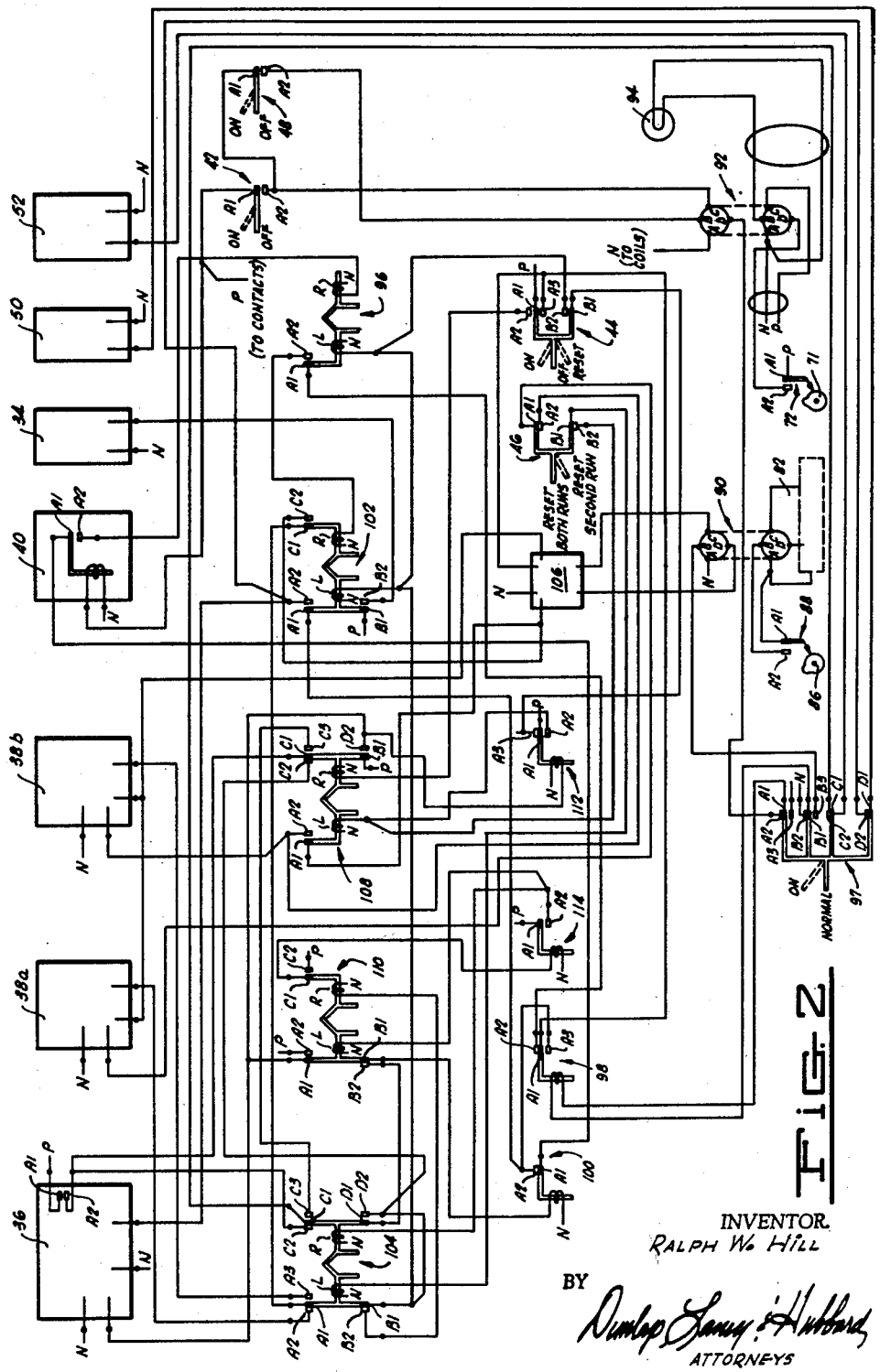

June 8, 1965 R. W. HILL 3,187,551
AUTOMATIC METER PROVER
Filed Aug. 17, 1961 3 Sheets-Sheet 3
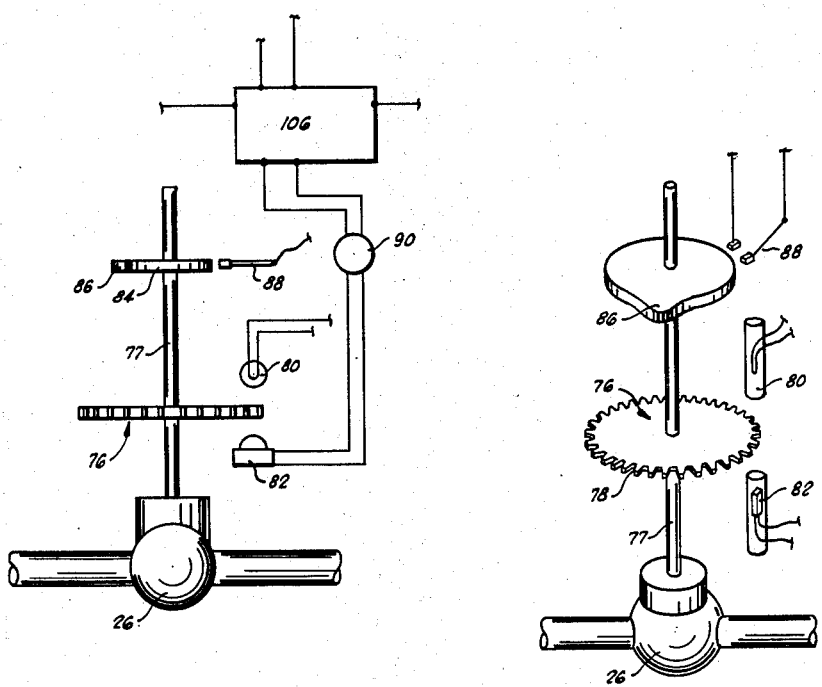
Fig. 4
Fig. 5
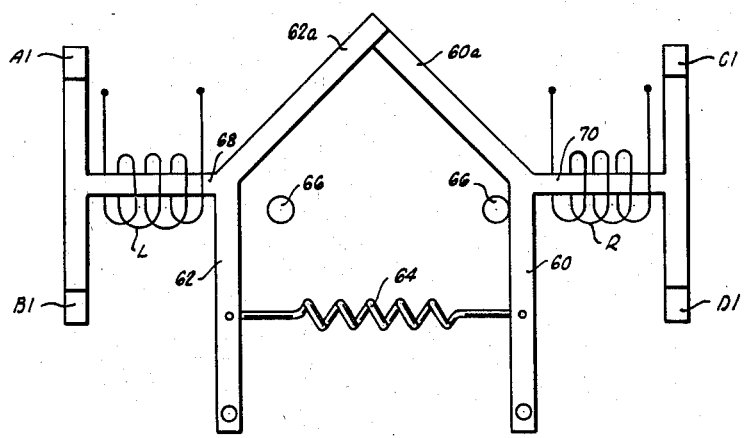
Fig. 3
INVENTOR.
RALPH W. HILL
BY
*Dunlap, Laney & Hubbard*
ATTORNEYS United States Patent Office 3,187,551
Patented June 8, 1965

3,187,551
AUTOMATIC METER PROVER
Ralph W. Hill, Tulsa, Okla., assignor, by mesne assignments, to National Tank Company, Tulsa, Okla., a corporation of Nevada
Filed Aug. 17, 1961, Ser. No. 132,045
18 Claims. (Cl. 73—3)

This invention relates generally to improvements in the art of proving positive displacement meters. More particularly, but not by way of limitation, the present invention relates to an improved method and system for automatically transferring the possession of crude oil from an oil producer to a receiving pipeline by continuously utilizing a production meter and periodically utilizing a check meter to verify the accuracy of the production meter.

Oil initially produced is stored in stock tanks provided on the producing lease for this purpose. The oil producer then transfers the oil contained in such stock tanks to a receiving pipeline. In order for an accurate determination to be made of the quantity of oil transferred so that the interests of the producer and the pipeline company may be correctly adjusted, it is necessary to provide some means of metering or gauging the quantity of oil which is actually physically transferred. Previously, the determination of the quantity of the oil transferred has been jointly performed manually by representatives of both the producer and the pipeline company. Thus, at such time as oil which is accumulated in a lease stock tank is ready for transfer to the pipeline, the lease pumper and the pipeline gauger have, in each other's presence, manually gauged the contents of the tank before and after transfer to ascertain the quantity of oil transferred. Such gauging operations have necessarily been preferably performed during hours of daylight due to the inconvenience and hazards of nighttime operations. Moreover, this method involves a large amount of storage equipment, as well as many man-hours for gauging and quality testing operations.

More recently, both the producing and pipeline divisions of the oil industry have turned to the use of mechanization and automation for automatically measuring and transferring the custody of oil at the lease site. A widespread technique now in use, for example, is that of passing the oil through a positive displacement meter located between the stock tank and the pipeline, which meter is intended to measure the volumetric transfer of oil with the required accuracy. Although the metric system of quantitative transfer determination constitutes a vast improvement over the manual gauging technique previously used, such meters inherently tend to drift and to develop minor errors in their measurement of the oil flow due to fluctuations of temperature, shock to the meter mechanism, and other factors. Because of the experience of the industry with the development of such errors in the positive displacement meters now in use, it has been found advisable to at least periodically check or prove the meters for accuracy. Normally, these meters, hereinafter termed production meters, are proved about once each month. Such meter proving frequently consists of running the oil to be transferred through the production meter which is installed upon the transfer line extending from the stock tank on the oil lease, then measuring the same quantity of oil which has been passed through the production meter by the use of a calibrated check or prover tank. In the usual practice, two runs are made to impart greater accuracy to the proving. Although such prover tanks have been found desirable for usage in many types of installations, they have no relation to the present invention and will not be discussed in detail herein.

Another method of meter proving presently in use consists of passing the oil which has already been run through the production meter through a second meter called a check meter or master meter which is temporarily or permanently connected in series with the production meter. This method of calibrating the production meter by means of a check meter is widely used. It is with systems employing such check meters for calibrating or proving production meters that the present invention is concerned.

Check meters may be utilized in a crude oil custody transfer system in two different ways; that is, either continuously or periodically. Several prior workers in the art have devised systems wherein the production meter and the check meter are connected either in series or in parallel in such a manner that both of the meters measure equal volumes of oil. The meters are ordinarily interconnected by some sort of control system for the purpose of sounding an alarm or stopping the flow of oil when the difference in the measurements of the two meters exceeds a predetermined maximum. Initially, the oil must be run through both of the meters for a sufficient length of time for the check meter to approach the oil temperature. After the temperature of the check meter has reached the desired value, suitable counters are electrically connected to the meters for the purpose of registering the amount of oil which has been passed through each of the meters. After a predetermined amount of oil has been passed through the production meter, the oil flow through both meters, or through only the check meter, is stopped by means of a valve or by turning off the pump, depending upon the degree of difference in the readings of the production and check meters.

In the most recent types of production meter proving systems, the check meter and its associated counter are instrumented so that the counts registered on the check meter counter represent but a fraction of the quantity of the oil required to register a count on the production meter counter. In other words, the production meter counter will ordinarily be graduated in barrels and the check meter counter may read in hundredths of a barrel. The accuracy of the production meter is then determined by a comparison of the two counter readings, and by virtue of the incremental readings of the check meter counter, the operator is usually able to interpolate to the thousandths of a barrel in determining the accuracy of the production meter.

In calculating the accuracy of the production meter, a quantity of from five to twenty barrels of oil will be passed through both of the meters while they are connected in series, and after the check meter has reached approximately the temperature of the oil. After the desired number of barrels of oil have been run through the meter, the flow through the check meter or both meters is stopped, and the readings from both counters are taken. A meter factor is determined by dividing the check meter reading by the production meter reading. The test will then be repeated and a second meter factor calculated. If the two meter factors agree within a predetermined amount, normally 0.05 percent, the average of the two factors is taken as the final meter factor. This final meter factor is then utilized to correct all subsequent readings of the production meter to determine the actual quantity of oil which is transferred from the lease to the pipeline. The final meter factor, thus determined, will be utilized until the next proving of the production meter, at which time a new meter factor will be determined.

In the event the meter factors determined upon two successive proving runs do not agree within the specified predetermined amount, further tests are run until such agreement between two successive runs is obtained. In the event such agreement cannot be obtained, this is indicative that either the production meter or the master meter is malfunctioning and requires repair. Normally, the producing oil company and the pipeline company agree beforehand on the allowable tolerance between the two meter factors as determined by two successive runs, but the figure of 0.05 percent is widely accepted.

Although the described check meter system has proven simpler and faster than using a prover tank for determining the accuracy of the production meter, a number of disadvantages have characterized the check meter system. Thus, a relatively high level of skill is required on the part of operating personnel charged with the responsibility of reading and interpolating the meter readings, and then calculating the proper meter factor. It is also necessary to constantly attend the meters and counters during proving runs in order to start them and stop them as required and take down the necessary readings between the two customary runs. Also, since both the production meter and check meter and their counters are started once and stopped once during each proving run, there is inherently some mechanical error developed since the meters are not running at a constant rate throughout the test. Meter accuracy drops off swiftly when operating at less than ten percent of the rated capacity, a condition which occurs momentarily when the meter is started or stopped.

Another disadvantage which has characterized check meter systems previously utilized is the detrimental effect on meter readings and accurate determination of the meter factor due to the influence of temperature. Thus, although most production meters have an automatic temperature compensator mechanism incorporated therein and thus give a reading which is corrected to a standard temperature of 60° F., no such corrective mechanism is incorporated in the check meter since the drag and frictional factors involved by incorporation of such mechanism would tend to render the check meter less accurate. Consequently, some type of measurement of the temperature of the oil flowing through the check meter must be made and a temperature correction factor applied to the reading obtained. The proper application of the temperature correction factor, as well as the instrumentation employed for correctly determining the temperature of the oil during the testing runs, has previously, along with the errors resulting from starting up and stopping the proving runs, constituted the greatest source of inaccuracy in the final determination of the final or average meter factor.

The present invention contemplates a novel automatic meter proving system wherein the performance of a production meter may be more conveniently and accurately checked by means of a master or check meter placed in series with the production meter than has previously been the case with meter proving systems used in the automatic custody transfer of crude oil. In accordance with the invention, oil is passed first through the production meter, which is permanently located in the transfer line between the lease and the receiving pipeline, and then is directed through a check meter which is temporarily connected in series with the production meter for the duration of the proving test. The production meter is electrically connected to a preset counter which registers a preselected number of quantitative units (such as barrels) of oil as this amount of oil passes through the production meter. The check meter is automatically electrically connected in consecutive sequence to a pair of counters which, in each case, registers the quantity of oil which has passed through the check meter.

The check meter counters and the electrical circuitry connecting these counters to the check meter are constructed so that each quantitative unit of oil which is registered on the check meter counters is but a small increment, preferably one one-thousandth, of the quantitative unit registered on the production meter counter. Thus, for example, with the production meter counter reading in barrels and the check meter counter reading in thousandths of a barrel, the accuracy of the production meter may be checked to the nearest one ten-thousandth of a barrel quite easily by simply presetting the production meter counter to register the passage of at least ten barrels of oil through a production meter and then comparing the readings registered by the two meters.

An important feature of the invention is the manner in which two successive proving runs may be automatically made without starting or stopping or even decreasing or increasing the rate of flow of oil through the production and check meters. This automatic, non-fluctuating operation eliminates the errors previously originating in the necessary stopping and starting, and, in addition, greatly reduces the possibility of human error being introduced in the calculation of the final meter factor. Moreover, constant supervision of the system throughout the entire duration of the proving operation is not required.

The present invention also provides means for automatically rerunning the second check of the production meter utilizing the second check meter counter, without disturbing or altering the readings obtained on the first check meter counter during the first check run. This is a valuable element of the invention, since it prevents the necessity of rerunning the first check run in the event some malfunction or known inaccuracy is developed after completion of the first run and during the second run. The invention also permits all counters to be automatically reset to a zero reading following both proving runs.

Other features of the invention are electrical circuitry permitting semiautomatic temperature compensation of the check meter, means for automatically checking out the check meter-to-check meter counter circuitry to determine if it is functioning properly, and automatically actuated counters for indicating the total barrels of oil passing through the check meter during the use of the automatic proving system and for indicating the total number of proving or testing runs which have been made during the use of the system. The latter two features are of advantage in permitting the system to be rented for production meter proving on a per-run or a per-barrel basis, as desired.

Finally, the entire system is compactly integrated so that it may be mounted upon a trailer for portability. Ease of transport of the system from one lease to another is thus facilitated.

From the foregoing discussion, it will be appreciated that an important object of the invention is to provide a system for accurately checking the reliability of a production meter used to quantitatively measure the amount of oil transferred from an oil producing lease to a receiving pipeline.

Another object of the invention is to provide a compact, reliable automatic meter proving system which can be mounted on a trailer or the like for easy portability.

An additional object of the invention is to provide a system for proving or checking production meters of the type used in the automatic custody transfer of crude oil, which system may be conveniently leased on a per-proving run or a total barrel through-put basis as desired.

A further object of the invention is to provide a novel method and system for determining the degree of difference in the measurements of two meters.

Another object of the invention is to provide a completely automatic custody transfer system for transferring crude oil from a producing company to a pipeline company, wherein the company will be assured that the oil transferred will be quantitatively measured with a maximum of accuracy and without the development of excessive error due to the influence of temperature variations.

A further object of the invention is to provide a meter proving system which may be utilized in a crude oil automatic custody transfer system to make two successive proving runs where the last run automatically takes place upon completion of the first run, and the rate of flow of oil through the system is maintained constant during and between each of the two runs.

A still further object of this invention is to provide a novel automatic meter proving system which may be economically manufactured, will require a minimum of maintenance service, and will have a long service life.

Other objects and advantages of the invention will be evident from the following detailed description, when read in conjunction with the accompanying drawings which illustrate my invention.

In the drawings:

FIGURE 1 is a view in elevation of a crude oil custody transfer system having the meter proving system of the present invention incorporated therein.

FIGURE 2 is a wiring diagram illustrating the manner in which the indicating instruments of the system are electrically wired and actuated.

FIGURE 3 is a schematic illustration of a latching relay of the type used in the preferred embodiment of the present invention.

FIGURE 4 is a view in elevation of the electromechanical linkages between the check meter used in the present invention and the circuitry connecting the check meter in its associated check meter counters.

FIGURE 5 is a perspective view of the combination illustrated in FIG. 4.

Referring now to the drawings in detail, and particularly to FIG. 1, reference character 10 designates a stock tank located on an oil lease for the purpose of storing crude oil therein prior to its transfer to a receiving pipeline. A transfer line 12 is connected to the stock tank 10 at a point near the bottom of the tank and facilitates the transfer of the crude oil from the tank to the gathering system of the receiving pipeline (not seen). A suitable pump 14 is connected in the transfer line 12 to pump the oil from the stock tank. Downstream from the pump 14, a production meter 16 having a mechanical counter 17, a back pressure valve 18, and prover meter bypass valve 20 are also connected in the transfer line 12.

A pair of branch conduits 22 branch from the transfer line 12 on either side of the prover meter bypass valve 20 and terminate in a pair of couplings 24 to facilitate connection of a check meter 26 in series with the production meter 16 by means of connecting conduits 27. Adjacent the couplings 24 at each end of the branch conduits 22 are located a pair of valves 28 which, in conjunction with the prover meter bypass valve 20, permit the check meter 26 to be selectively connected in series with the production meter 16 or, alternately, isolated from the transfer line 12, as may be desired.

The production meter proving unit of the present invention may conveniently be mounted upon a trailer 30 for ease of portability. The instrument panel of the system is designated generally by reference character 32 and may be mounted on the trailer 30 in any clearly visible position. The instrument panel 32 includes a strip chart recorder 34 for recording the temperature of the oil as it passes through the check meter 26 during the proving runs. This temperature is sensed by a suitable temperature sensing element 35 which is placed in the conduit 27 adjacent the check meter 26. A production meter counter 36 is provided to register the barrels of oil metered by the production meter 16. In the preferred embodiment of the invention depicted in the drawings, the production meter counter 36 is a type which may be preset to register a predetermined number of barrels and then stop. Counter 36 is also provided with an electrical resetting mechanism as hereinafter described.

A pair of check meter counters 38a and 38b are utilized to consecutively register the number of barrels passed through the check meter 26 during the proving operation as such barrels are metered by the metering mechanism of the check meter. Initially, the check meter counter 38a registers the passage of oil through the check meter 26 during the first of two consecutive proving runs, while the check meter counter 38b becomes operative and registers the quantity of oil passed through the check meter 26 after the first proving run is completed and during a second proving run. Both of the check meter counters 38a and 38b are high-speed, electrical-impulse actuated, electrically resettable counters.

A time delay instrument is indicated by reference character 40 and functions to prevent the energization of the production meter counter 36 and the check meter counters 38a and 38b until the check meter 26 has had sufficient time to warm up to approximately the temperature of the oil passing therethrough. The time delay instrument 40 is preferably an electrical time delay relay. A series of switches 42, 44, 46 and 48 are provided for the functions of energizing the system and resetting the counters in a manner hereinafter described in detail.

Finally, the instrument panel 32 is equipped with a counter 50 for indicating the total number of barrels which have been run through the system during a proving operation as metered by the production meter 16, and with a counter 52 for registering the total number of proving runs which have been made. The purpose of the counters 50 and 52 is to permit the proving system to be rented or leased on a per-barrel basis or upon a per-run basis as desired. A suitable directly measuring temperature instrument 56 is inserted in the conduit 27 just upstream from the check meter 26 to permit the accuracy of the strip chart recorder 34 to be checked.

Before proceeding to a detailed description of the electrical circuitry utilized in the present invention, the basic general steps followed in operating the system will be described with reference to FIG. 1. After crude oil has been accumulated in the stock tank 10, it is desirable to transfer this oil from the producing lease to the gathering system of the receiving pipeline (not shown). To effect such transfer, the pump 14 is started and oil is pumped out of the stock tank 10 through the transfer line 12. In the transfer line 12, the oil first passes through the positive displacement production meter 16 which carries a visual mechanical counter 17 to indicate the amount of oil passing through the production meter 16 as measured by the meter. Simultaneously with the passage of the oil through the production meter 16 and the operation of its mechanical counter 17, a series of pulses are generated in an electrical circuit which links the production meter 16 to its electrical counter 36 located on the instrument panel 32. This counter, however, will not yet begin to register a running total of the pulses produced by such electrical circuit.

After passing through the production meter 16, the oil continues to flow through the transfer line 12. A back pressure valve 18 is provided downstream in the transfer line 12 in the position shown in FIG. 1. Of course, if the accuracy of the production meter 16 is not being checked by means of the automatic proving system of the present invention, the oil in transfer line 12 continues to pass through this line to the gathering system of the receiving pipeline and, in transit, passes through the prover meter bypass valve 20. On the other hand, when it is desired to prove or check the production meter 16, the trailer 30 carrying the portable prover system is parked close to the oil transfer line 12 and the connecting conduits 27 are connected to the couplings 24 at the ends of the bypass branch conduits 22. The bypass valve 20 is then closed after the valves 28 have been opened so that the flow of oil in line 12 is diverted through the check meter 26.

The check meter 26 is electrically connected to the two check meter counters 38a and 38b in such a way that, after an initial warmup period hereinafter described, the first check meter 38a commences to register pulses developed in the circuitry connecting the check meter 26 with this counter. At the same time, the production meter counter 36 commences to register the pulses developed in the production meter electrical circuit. The second check meter counter 38b will not be operative during the initial registration of pulses by the production meter counter 36 and the first check meter counter 38a, but will instead become operative after a certain predetermined number of pulses has been registered by the production meter counter 36. The second check meter counter 38b will then continue to register the pulses produced in the check meter circuit for a predetermined number of additional pulse registrations by the production meter counter 36. In this way, two consecutive runs may be automatically made using the two check meter counters 38a and 38b so that a double-check of the accuracy of the production meter counter 36 may be obtained.

Before any of the counters thus far described are energized, however, the check meter 26 must be given an opportunity to attain a temperature approximating that of the oil which passes therethrough. This is necessary in order to obtain the maximum accuracy in the check meter measurements of the oil passing therethrough, since the mechanism of the meter will respond differently under different temperature conditions. However, a temperature compensating mechanism tends to impose some frictional drag upon the moving meter components and, in order to avoid the development of inaccuracies from this source, the check meter 26 is not equipped with such a temperature compensating mechanism. Instead, the temperature sensing element 35, such as a thermocouple or the like, is placed in the conduit 27 adjacent the check meter 26 and is electrically connected to a strip chart recorder 34, which records the temperature of the oil passing through the check meter 26 during the proving run. In order to permit the check meter 26 to closely approach the temperature of the oil passing therethrough prior to energizing the production meter counter 36 and the check meter counters 38a and 38b, the adjustable time delay relay 40 is set to delay the closure of the circuits to these counters until a sufficient time has passed to permit the check meter 26 to "warm up." Electrical switches 42 and 44 are closed to commence the operation of the time delay relay 40 and switch 48 is closed to illuminate the system when it is operated at night.

As has previously been explained, the counters 50 and 52 are respectively provided for indicating the total barrels of oil which have been passed through the production meter 16 during the use of the automatic prover system, and to indicate the total number of runs which have been made utilizing the counters 38a and 38b. This feature permits the proving unit to be rented on either a per-barrel or a per-run basis as may be most desirable.

The switch 46, in conjunction with the switch 44, is provided to facilitate the selective resetting of the two check meter counters 38a and 38b at the end of certain proving runs. Thus, the switches may be placed in one position to permit both of the check meter counters 38a and 38b to be reset to a zero reading simultaneously with the resetting of the production meter counter 36 after the second proving run has been completed. Alternatively, a different setting of the switches 44 and 46 will result in only the second check meter counter 38b being reset along with the production meter counter 36 after the second proving run. In this way, the reading which has been registered upon the first check meter counter 38a may be preserved intact so that the first proving run data is maintained even though it becomes necessary for some reason to rerun the second proving run on the second check meter counter 38b.

At the end of each of the proving runs, the average temperature of the oil passing through the check meter 26 during that particular run is derived from the record inscribed on the chart of strip chart recorder 34. The check meter counter readings may then be corrected to a reading for the oil at the standard temperature of 60° F. by applying the appropriate factor corresponding to the temperature of the oil during the run. As a check upon the proper functioning of the strip chart recorder 34 in recording the temperature during the run, a glass stem thermometer 56 is provided in the conduit 27 to register directly the temperature of the oil immediately before its passage through the check meter 26.

Having now described the general overall operation of the automatic custody transfer system of the present invention, as it may be pointed out by reference to FIG. 1, the details of construction of the electrical circuitry and the electromechanical linkages employed in the invention will next be described. Since a number of rather sophisticated latching relays are employed in the electrical circuitry of the invention, these particular elements will initially be described. Reference is made to FIG. 3 in which one of the latching relays is illustrated. Each of the latching relays comprises a pair of vertically extending arms 60 and 62 which are pivoted at their lower ends for swinging movement about a horizontal axis. The arms 60 and 62 are biased toward each other about their pivotal axes by a spring 64 which interconnects the arms. Stops 66 are provided to limit the inward movement of the arms 60 and 62. The arms 60 and 62 are bent inwardly at their upper ends 60a and 62a, respectively, toward each other so that the extreme upper ends of the arms make sliding contact with each other and prevent simultaneous movement of the arms in the same direction. For example, the arms 60 and 62 are shown in their left-hand positions in FIG. 3.

When the arms 60 and 62 are moved to their right-hand positions, the arm 60 must first pivot clockwise a predetermined distance before the arm 62 can be moved. When the arm 60 has been moved from underneath the upper end of the arm 62, the spring 64 will snap the arm 62 clockwise against its respective stop 66, such that the upper end 62a of the arm 62 will then be underneath the upper end 60a of the arm 60. When the arms are moved to the left, the arm 62 is moved first and then the arm 60 is moved in a sequence which is the reverse of the right-hand movement of the arms. Thus, when each of the latching relays is actuated, one of the arms thereof is moved before the other arm to provide a timed delay between the operation of switches carried by the opposite arms. For example, the movable contacts A1 and B1 of a pair of switches may be carried on the outer end of a shaft 68 extending outwardly from the arm 62, and the movable contacts C1 and D1 of another pair of switches may be carried on the outer end of a shaft 70 extending outwardly from the arm 60. In this example, there is always a time delay between the closure of the A1 and B1 contacts with their corresponding fixed switch contacts, and the closure of the C1 and D1 contacts with their corresponding fixed contacts.

Each of the latching relays is actuated by a left-hand coil, designated L, and a right-hand coil, designated R. When the L coil is energized, the arms 62 and 60 will pivot counterclockwise, or to the left, and when the R coil is energized, the arms 62 and 60 will pivot clockwise, or to the right. When neither of the coils L or R is energized, the arms 60 and 62 will stay in their positions last assumed with one of the arms being in contact with its respective stop 66.

As has been previously indicated, the quantitative units which are registered upon the check meter counters 38a and 38b are necessarily only fractions of the quantitative units which are registered upon the production meter counter 36. Preferably, each unit of measurement registered on the check meter counters 38a and 38b is one one-thousandth (or smaller) of each of the units registered on the production meter counter 36. In order to obtain this relationship, the electrical pulse generating circuit which is connected to the production meter counter 36 is electromechanically connected to the production meter 16 by means of a one-lobe cam 71 connected to the shaft of the production meter and a switch 72 (shown in FIG. 2) positioned adjacent the cam 71 for closure thereby once during each revolution of the cam. Thus, with the production meter 16 constructed so that its shaft makes one revolution during the passage of approximately one barrel of oil therethrough, the pulse-producing circuit connected to the production meter counter 36 will be closed once during the passage of each barrel of oil through the production meter 16. Thus, one pulse is delivered to the production meter counter 36 for each barrel of oil passing through the production meter 16 as measured by the metering mechanism thereof.

In order to have the check meter counters 38a and 38b register in thousandths of a barrel or less, a peripherally slotted disc 76 is coaxially secured to the shaft 77 of the check meter 26 for rotation therewith. One thousand or more slots 78 are cut in circumferentially spaced relation around the outer periphery of the disc. Alternatively, a smaller number of slots might be used in conjunction with suitable speed increasing gearing to give the desired registration of thousandths of a barrel or less on the check meter counters 38a and 38b. A source 80 of light or other electromagnetic energy is positioned on one side of the disc 76 directly above the slots 78 so that the downward transmission of light rays is intermittently interrupted as the disc rotates by the interposition in the path thereof of the teeth defining the slots. A photoelectric cell 82 is positioned on the opposite side of the disc 76 from the source of light 80, and is aligned with the slots 78 and light source 80 so that light passing through the slots impinges upon the photoelectric cell 82. This arrangement is illustrated in FIGS. 4 and 5.

It will be apparent from what has been said that light will impinge upon the photoelectric cell 82 intermittently, and a number of times for each revolution of the disc 76 corresponding to the number of slots 78 formed in the outer periphery of the disc. The photo-electric cell 82 is connected in a suitable electrical circuit, subsequently to be described, which is in turn connected at different times to the check meter counters 38a and 38b. In this way, with the shaft 77 of the check meter 26 making one revolution for the passage of each barrel of oil therethrough, one thousand pulses will be generated by the photoelectric cell 82 and passed through the connecting electrical circuit to one of the check meter counters, 38a or 38b, depending upon which of the two is at the time connected to the photoelectric cell circuit.

As further shown in FIGS. 4 and 5, the shaft 77 of the check meter 26 carries a second plate formed as a single lobe cam 86 which functions in closing a switch 88. The function of the switch 88 in permitting the circuitry of the system to be checked for proper operation will be subsequently described in detail.

The electrical circuitry of the production meter proving system of the present invention is illustrated in FIG. 2. It is believed that the details of construction and operation of the several elements of the circuits may best be understood by describing the sequence of actuation of the elements as the system is utilized in a proving operation. To facilitate the readers' understanding of the circuit elements, however, several generalities applicable to the circuit diagram should first be mentioned.

First, a number of relays of various types having periodically energized coils constitute important elements of the circuitry. An electrical lead from one side of these coils is, in most cases, broken away, and the letter "N" adjacent the end of this lead indicates simply that the lead is connected to one side of a common electrical circuit, say, the side of relatively negative polarity, hence the letter "N." This designation is also used and has the same connotation in the case of broken away leads from some of the other circuit elements. As a corollary of this nomenclature, some other leads which are broken away have the letter "P" positioned adjacent to termination of the lead to indicate that these leads are connected to the other, or positively polarized, side of the common electrical circuit. Generally, the latter leads are those connected to the contacts of relays or other switches used in the circuitry.

Another general aspect of the circuit diagram of FIG. 2 is the manner in which the contacts of all switches, both electrically operated relay switches, mechanically operated switches, and manually operated switches, are illustrated. The moving contacts of the switches are represented by solid black rectangles while the fixed contacts are illustrated as white rectangles. Also, each contact is designated by a letter and a numeral, such as contact A1 of switch 72. Where the numeral 1 is used, a moving contact is indicated. Numerals 2 and 3 will be used to refer to fixed contacts.

Turning now to a description of the circuit elements as they are sequentially placed in operation during a proving run, the automatic prover circuitry is initially connected by means of a plug and socket 90 to the photoelectric cell pulse generator associated with the check meter 26 as shown in FIGS. 4 and 5. The plug and socket connection 90 is a four-terminal connection of the cannon plug type as shown in FIG. 2 so that four leads may be attached to both the plug and socket for reasons which will subsequently become manifest.

A second plug 92 is provided to facilitate electrically connecting the automatic proving system to the automatic custody transfer unit in situations where a source of power is available as a part of such transfer unit. The plug 92 is, like plug 90, a cannon plug. A suitable light 94 is provided for the purpose of illuminating the instrument panel 32 when the automatic proving system is utilized at night. The light 94 is connected through plug 92 to a switch 48 located on the instrument panel 32 for the purpose of permitting the light to be turned on and off.

After the automatic proving system of the invention has been hydraulically and electrically connected to the automatic custody transfer unit, the switch 42, which is the main power switch, is closed, or moved to the ON position, completing the electrical circuit from the external source (not shown) through the plug and socket 92 to all components of the circuit requiring electrical power. As has been indicated, in general, all circuit element contacts are in the "P" line, with the "N" line going directly to all coils, etc., requiring electrical power.

The switch 44 is next placed in the ON position in order to complete those circuits necessary to commence the proving runs. In the ON position of the switch 44, contacts A1 and A3 are closed, as are contacts B1 and B2.

With the closure of contacts A1 and A2 of the main power switch 42, a circuit is completed to the coil of the adjustable time delay relay 40. After the elapse of a predetermined time interval as determined by the adjusted setting of the time delay relay 40, the time delay relay contacts A1 and A2 close, partially completing an electrical circuit to the right coil of a latching relay 96. With the circuitry of the automatic proving system in this status, the next closure of the production meter switch 72 by the production meter cam 71 completes a circuit through contacts A1 and A2 and B1 and B2 of a test switch 97 to the coil of a relay 98. The shifting of relay 98 closes contacts A1 and A3 of this relay, thereby completing the electrical circuit to the right coil of the latching relay 96. This circuit, it will be noted, includes the closed contacts A1 and A3 of the switch 44 and the closed contacts A1 and A2 of the relay 100. Upon the completion of the electrical circuit through the right coil of the latching relay 96, this relay shifts to the right in the manner previously described, whereupon:

(a) The contacts A1 and A2 of the latching relay 96 are closed. The closure of these contacts partially completes an electrical circuit to the right coil of a second latching relay 102, which circuit includes contacts A1 and A2 of the relay 98, and contacts A1 and A3 of the switch 44.

As soon as the production meter switch 72 is permitted to open by the rotation of the production meter cam 71, the circuit to the coil of the relay 98 is opened to permit the relay 98 to shift to its initial position as shown in FIG. 2, thereby closing its contacts A1 and A2, and completing the electrical circuit to the right coil of the latching relay 102. The latching relay 102 then shifts to the right, whereupon:

(a) Contacts B1 and B2 of the latching relay 102 close to complete an electrical circuit to the motor of the strip chart temperature recorder 34, causing the recorder chart to move uniformly and record the oil temperature, and (b) Contacts A1 and A2 of latching relay 102 close, partially completing an electrical circuit to the counting solenoids of the production meter counter 36 and the total barrels counter 50. The circuits to these solenoids are completed each time the contacts A1 and A3 of relay 98 are closed. The closure of these latter contacts in turn occurs each time the production meter switch 72 is closed by the production meter cam 71 which is secured to the shaft 77 of the production meter 16. All of the counters are designed so that their solenoids, when energized, pull a pawl against a spring, and when de-energized, the pawl is released and engages a ratchet in the drum on which the counter figures are shown, rotating the drum so that the next digit is visible. Thus, the readings indicated on the counters do not change when the counter solenoids are energized, but rather at the time when the solenoids are de-energized.

From what has thus far been said about the circuitry of the invention, it will be apparent that after the adjustable time delay relay 40 has timed out, a circuit will be completed to the latching relay 96 at the first closure of the contacts A1 and A3 of relay 98 which corresponds in turn to the first closure of switch 72 by the production meter cam 71. This action places the latching relay 96 in the right-hand position so that when the coil of the relay 98 is again deenergized by rotation of the production meter cam 71, a circuit to the right-hand coil of latching relay 102 will be completed through contacts A1 and A2 of the relay 98, thereby causing the latching relay 102 to move to the right and close its contacts A1 and A2 in preparation for the completion of the circuits to the solenoids of counters 36 and 50 upon the next closure of contacts A1 and A3 of relay 98 as the production meter cam 71 again closes the switch 72. In other words, at the second closure of the switch 72 by the cam 71 after the time delay relay 40 has timed out, the first electrical pulse flows through the counting solenoids of the counters 36 and 50. At the immediately following opening of production meter switch 72 by the further rotation of the production meter cam 71, these solenoids are de-energized and the first count is registered on the production meter counter 36 and the total barrels counter 50. An additional count is registered upon each subsequent rotation of the cam 71 to close and then open the switch 72. As has previously been explained, each complete rotation of the cam 71 corresponds to the passage of approximately one barrel of oil through the production meter 16.

(c) Contacts C1 and C2 of latching relay 102 are closed so that an electrical circuit is completed through the contacts A1 and A2 of a third latching relay 104 to the first check meter counter 38a and to a power amplifier 106. The power amplifier 106 is connected through the plug 90 to the photoelectric cell 82 in the manner illustrated in FIGS. 4 and 2. With this arrangement, an electrical pulse will be generated, amplified and transmitted to the solenoid of check meter counter 38a each time the peripherally slotted disc 76 coaxially secured to the check meter shaft 77 permits light to strike the photoelectric cell 82. At each interruption of the light beam by the teeth defining the slots 78, the coil of the solenoid of counter 38a is de-energized, whereupon the spring-loaded pawl rotates the numbered drums of this counter to display one additional digit. It will be noted that check meter counter 38a commences registering in thousandths of a barrel as soon as the electrical circuit to that counter is completed, whereas the production meter counter 36, as previously explained, does not indicate the first barrel of oil passed through the production meter 16 until passage of that quantity of oil through the meter is completed.

With the circuits of the automatic proving system in this status, counting on the counters 36 and 38a continues until the production meter counter 36 has registered a total number of barrels equivalent to a reading which has been preset into the production meter counter 36. When this preset number of barrels has been registered upon the production meter counter 36, a pair of contacts A1 and A2 in the production meter counter 36 automatically close under the influence of the count-out mechanism (not shown), whereupon:

(a) A circuit is completed to the left coil of the latching relay 102 through contacts A1 and A2 of the production meter counter 36 and contacts C1 and C2 of a fourth latching relay 108.

(b) Simultaneously, with the energization of the left coil of the latching relay 102, the left coil of the latching relay 96 is energized by means of a circuit also made through the contacts A1 and A2 of production meter counter 36 and latching relay 108 contacts C1 and C2.

Upon the energization of the left coil of the latching relay 102, this relay will return again to its left-hand position as shown in FIG. 2, thereby opening its contacts A1 and A2, B1 and B2 and C1 and C2, whereupon:

(a) The opening of the contacts B1 and B2 of the latching relay 102 breaks the circuit to the temperature recorder 34, thereby stopping the movement of the recorder chart.

(b) The opening of the contacts A1 and A2 of the latching relay 102 opens the counting circuits to the production meter counter 36 and total barrels counter 50 so that no further electrical impulses caused by the closure of the production meter switch 72 will reach these counters.

(c) The opening of contacts C1 and C2 of the latching relay 102 breaks the circuit to the check meter counter 38a so that no further electrical pulses generated by the photoelectric cell 82 are registered upon that counter.

At this point in the proving operation, the first proving run may be said to be completed to the extent that it will be registered on the production meter counter 36, the first check meter counter 38a, the total barrels counter 50, and the chart of temperature recorder 34. In other words, the predetermined throughput of oil through the production meter 16 has been registered upon the production meter counter 36, and the corresponding reading in incremental quantitative units has been registered upon the first check meter counter 38a. As discussed hereinbefore, the units registered upon the check meter counter 38a are only fractions of those units which are registered upon the production meter counter 36, and in the preferred embodiment being described herein, these units are preferably one one-thousandth of a barrel and one barrel, respectively.

As stated above, the left coil of the latching relay 96 is energized simultaneously with the left coil of the latching relay 102. Energization of the left coil of the latching relay 96 moves this relay to the left, opening its contacts A1 and A2 and thereby breaking the circuit to the right coil of the latching relay 102 so that it is free to move to the left as its left coil is energized. Both of the latching relays 96 and 102 are now in their original positions as shown in FIG. 2. In order to commence the second proving run it is therefore necesary for the contacts A1 and A2 of the production meter switch 72 to again be closed by the action of the cam 71 before the counting circuit to the production meter counter 36 can again be established, as previously described. It is first necessary, however, to connect the photoelectric cell 82 and the power amplifier 106 to the second check meter counter 38b in order to register the quantitative units of oil passing through the check meter during the second run upon this second check meter counter instead of the first check meter counter 38a, as previously described. Shifting of the output from the power amplifier 106 from the first check meter counter 38a to the second check meter counter 38b is accomplished at the closure of production meter counter contacts A1 and A2 as follows:

(a) A circuit is completed through the right coil of a fifth latching relay 110, the production meter counter contacts A1 and A2, contacts C1 and C2 of the latching relay 108, and contacts B1 and B2 of the latching relay 104. The energization of the right coil of the latching relay 110 causes this relay to shift to the right with the resultant closure of contacts A1 and A2, and contacts C1 and C2, of that relay, and the opening of contacts B1 and B2 thereof, whereupon:

(1) The closure of contacts A1 and A2 of the latching relay 110 energizes the resetting motor of the production meter counter 36, thereby resetting the production meter counter to a zero reading preparatory to again counting out the predetermined number of barrels which has been set into the counter. Upon this resetting of the production meter counter 36, the contacts A1 and A2 of this counter are again opened.

(2) The closure of contacts A1 and A2 of the latching relay 110 also is effective to partially complete an electrical circuit to the coil of time delay relay 112. Total completion of the circuit to the coil of the relay 112 is, at this time, prevented by the open contacts D1 and D2 of the latching relay 108. The time delay relay 112 is provided with a time delay which is not particularly critical, except that the time-out period must be less than the time required for the production meter cam 71 to make one revolution, and the time delay must be greater than the time delay of a second time delay relay 114 utilized in the system. The purpose and use of each of these time delay relays will be subsequently described.

(3) The closure of contacts C1 and C2 of latching relay 110 completes a circuit to the coil of the time delay relay 114. The time delay of this relay is not critical except it must be less than the time required for the production meter cam 71 to make one complete revolution, which is dependent upon the oil flow rate, and, as stated above, the time delay must also be less than the time delay of the time delay relay 112. After the time delay relay 114 has timed out, its contacts A1 and A2 close, whereupon:

(a) The left coil of the latching relay 110 is energized, whereupon:

(1) The contacts A1 and A2 of the latching relay 110 open, breaking the circuit which has reset the production meter counter 36.

(2) The contacts C1 and C2 of the latching relay 110 open, breaking the circuit which has energized time delay relay 114.

(3) Contacts B1 and B2 of the latching relay 110 close.

(b) Simultaneously, with the energization of the left coil of the latching relay 110 by means of the closure of contacts A1 and A2 of the time delay relay 114, the right coil of the latching relay 104 is also energized by a circuit completed upon the closure of these contacts of the time delay relay 114, whereupon the latching relay 104 moves to the right, whereupon:

(1) The contacts B1 and B2 of the latching relay 104 open, breaking the circuit which had previously energized the right coil of the latching relay 110. This circuit, however, had also previously been broken when the contacts A1 and A2 of the production meter counter 36 were opened upon resetting of that counter as previously described. In any event, by means of these two interruptions of the circuit to the right coil of the latching relay 110, this relay is free to shift to the left, as its left coil is energized in the manner described above.

(2) Contacts A1 and A3 of the latching relay 104 close, partially completing the counting circuit to the second check meter counter 38b. The completion of this circuit is at this time prevented by the open contacts C1 and C2 of the latching relay 102 which, as has been previously indicated, is at this time in its left position. The completion of this circuit to the second check meter counter 38b will be later described.

(3) Contacts A1 and A2 of the latching relay 104 open, thereby breaking the counting circuit to the first check meter counter 38a.

(4) The contacts C1 and C2 of the latching relay 104 are opened, thereby breaking the circuit to the counting solenoid of the total runs counter 52 which had previously been energized when the production meter counter 36 counted out and its contacts A1 and A2 closed. With the breaking of the circuit to the solenoid of the total runs counter 52, the counting drum of this counter indexes one digit, indicating that one proving run has been completed.

(5) The contacts C1 and C3 of the latching relay 104 close. Since the contacts C1 and C3 of latching relay 108 are open at this time, this circuit is not completed. The purpose and use of this circuit will be later described.

(6) Contacts D1 and D2 of the latching relay 104 are closed. Since the contacts A1 and A2 of the production meter counter 36 are at this time open, the circuit including the latter two contacts and the contacts B1 and B2 of the latching relay 104 is not completed. The purpose and use of this circuit will also be later described.

The first proving run has now been entirely completed and, additionally, all of the circuit components except the latching relay 104 are in their original position. The production meter counter 36 has been reset preparatory to commencing the second run. The counting circuit to the second check meter counter 38b has been partially completed preparatory to commencing the second proving run utilizing that counter for registering pulses developed by the photoelectric cell 82. With the latching relay 104 shifted to the right position, the check meter 26 will now count upon the second check meter counter 38b instead of counter 38a. Therefore, at the next closure of the contacts A1 and A2 of the production meter switch 72 by its associated cam 71, the latching relay 96 will shift to the right as previously described, and at the subsequent break of the contacts A1 and A2 of the switch 72, the latching relay 102 will also shift to the right as previously described, and counting will commence on the production meter counter 36. The shifting to the right of the latching relay 102 again closes contacts C1 and C2 so that counting may also be commenced upon the second check meter counter 38b.

The second proving run continues until the production meter counter 36 has again reached its predetermined reading or "counted out." When the production meter counter 36 has counted out, its contacts A1 and A2 again close, whereupon the latching relays 102 and 96 shift back to their left positions in a manner identical to that described for the first proving run. The shift of the latching relays 102 and 96 to the left position breaks the counting circuits to the production meter counter 36, check meter counter 38b, and total barrels counter 50, and also breaks the circuit to the motor of the temperature recorder 34.

At this point, a different sequence of events occurs by virtue of the location of latching relay 104 in its right position instead of its left position as it was upon the completion of the initial proving run. Thus, when the contacts A1 and A2 of the production meter counter 36 close at the end of the second proving run, a circuit is completed through the contacts D1 and D2 of the latching relay 104 and contacts B1 and B2 of the latching relay 110 to energize the coil of the relay 100. Thereupon, the contacts A1 and A2 of the relay 100 are opened, breaking the circuit which would normally energize the right coil of the latching relay 96 at the next closure of the production meter switch 72 by the production meter cam 71. Therefore, another counting sequence cannot commence while the counter 36 is in the counted out position with its contacts A1 and A2 closed as occurs at the end of the second proving run.

The two-run proving is now complete. Latching relays 102 and 96 are again in the left position, having been shifted to that position in the same manner as occurs at the completion of the first proving run and as previously explained. Latching relay 104 is still in the right position, and the latching relays 110 and 108 remain in the left position. The operator then records the average temperature of each of the two runs as indicated by the two markings on the strip chart recorder 34. The average temperature for each run will normally be the mid-point of the line inscribed upon the chart for each run. The readings on counters 36, 38a and 38b are also recorded by the operator. The operator is then ready to correct the readings of the check meter counters 38a and 38b for the effect of temperature by obtaining the temperature correction factor for each of the figures registered upon these recorders from the appropriate ASTM-IP temperature correction tables which are furnished with the proving unit of the invention. By knowing the American Petroleum Institute gravity of the oil as determined by methods commonly used in oil production practice, the operator may refer to the cited tables to determine the temperature correction factor for that particular gravity which is applicable to the oil being run. A calculator, furnished with the unit, may then be used to multiply the readings on check meter counters 38a and 38b by the appropriate temperature correction factor. This product is then multiplied by a known check meter factor to finally correct the factor for any known inaccuracies in the check meter. (This check meter factor is determined by calibrating the check meter by means of a prover tank or other accepted proving means. Normally, such determination of a check meter factor will be required only once or twice a year.) The last product so obtained is divided by the preset reading of production meter counter 36 to obtain the new production meter factor to be applied in using the production meter. Normally, as previously explained, the new production meter factor will be the average of the two factors calculated for both the first and second runs.

After the operator has taken down the data from the production meter counter 36, the check meter counters 38a and 38b, and the temperature recorder 34, he can then automatically reset each of the counters and shift the latching relay 104 back to its original left position so that the automatic proving system of the invention is ready for the commencement of the next proving operation. The resetting of the system to its original status is accomplished by momentarily holding the switch 44 in its RESET position, whereupon:

(a) The contacts A1 and A2 of the switch 44 close momentarily, completing a circuit to the right coil of the latching relay 108, causing this latching relay to shift to the right, whereupon:

(1) The contacts A1 and A2 of the latching relay 108 close, completing a circuit to the reset motor of the check meter counter 38b, and also completing a circuit through contacts A1 and A2 of the switch 46 to the reset motor of the check meter counter 38a. In this way, both of the check meter counters 38a and 38b are reset to the zero position.

(2) Contacts C1 and C2 of the latching relay 108 open, breaking the circuit which has shifted the latching relays 102 and 96 to the left position through the contacts A1 and A2 of the production meter counter 36, and which has kept the contacts A1 and A2 of the relay 100 open by energizing the coil of the latter relay through the contacts A1 and A2 of the production meter counter 36, the contacts D1 and D2 of the latching relay 104, and the contacts B1 and B2 of the latching relay 110.

(3) The contacts C1 and C3 of the latching relay 108 close, energizing the coil of the counting solenoid of total runs counter 52 through the contacts A1 and A2 of the production meter counter 36 and the contacts C1 and C3 of the latching relay 104.

(4) The contacts D1 and D2 of the latching relay 108 close, completing a circuit which resets the production meter counter 36, and which energizes the coil of the time delay relay 112. After the time delay relay 112 has timed out, (a) Relay contacts A1 and A3 of the time delay relay 112 open, breaking the circuit to the coil of the relay 100 which has also already been broken since switch 44 in that circuit was held in the RESET position only momentarily.

(b) Relay contacts A1 and A2 of the time delay relay 112 close, completing a circuit to the left coil of the latching relay 108, causing this latching relay to shift to the left, whereupon:

(1) The contacts D1 and D2 of the latching relay 108 open, breaking the circuit to the coil of the time delay relay 112, whereupon the contacts A1 and A2 of this relay open and the contacts A1 and A3 thereof close. However, as previously explained, the circuit in which the closed contacts A1 and A3 of the time delay relay 112 are located has already been broken after the switch 44 was released from its momentary RESET status. Opening of the contacts D1 and D2 of the latching relay 108 also breaks the resetting circuit to the production meter counter 36.

(2) The contacts C1 and C3 of the latching relay 108 open, breaking the circuit which energizes the coil of the counting solenoid of total runs counter 52, whereupon the spring-loaded pawl of this counter indexes one digit upon its counting drum, indicating that a second proving run has been completed.

(3) Contacts C1 and C2 of the latching relay 108 close, partially completing a circuit which is otherwise broken by the open contacts A1 and A2 of the production meter counter 36, which contacts were opened at the resetting of this counter.

(4) Contacts A1 and A2 of the latching relay 108 are opened, deenergizing the reset motors of the check meter counters 38a and 38b by breaking the electrical circuits thereto, and thereby completing the reset of these counters to a zero reading.

(c) The closure of the contacts A1 and A2 of the time delay relay 112 also completes a circuit through the contacts B1 and B2 of the switch 46 so that the left coil of the latching relay 104 is energized, causing this relay to move to the left to its original position, whereupon:

(1) The contacts D1 and D2 of the latching relay 104 open, breaking the circuit which has previously been effective to energize the coil of the relay 100 through contacts B1 and B2 of the latching relay 110 and contacts A1 and A2 of the production meter counter 36. Both of the latter sets of contacts were opened simultaneously by the resetting of the production meter counter 36.

(2) The contacts C1 and C3 of the latching relay 104 open, breaking the circuit which has previously energized the coil of the counting solenoid of total runs counter 52 through the contacts C1 and C3 of the latching relay 108 and the contacts A1 and A2 of the production meter counter 36.

(3) The contacts C1 and C2 of the latching relay 104 close, partially completing the circuit to the total runs counter 52 in preparation for the next proving operation.

(4) Contacts A1 and A3 of the latching relay 104 open, breaking the counting circuit to the check meter counter 38b so that the first run of the next proving operation will count on the check meter counter 38a.

(5) Contacts A1 and A2 of the latching relay 104 close, partially completing the counting circuit to the check meter counter 38a so that the first run of the next proving operation will count on that counter.

(6) Contacts B1 and B2 of the latching relay 104 close, partially completing the circuit to the right coil of the latching relay 110, which coil will be energized when the contacts A1 and A2 in the production meter counter 36 are closed at the end of the first proving run during a subsequent proving operation.

The automatic production meter proving system of the present invention has now been returned completely to its original status and is ready for the next proving operation. All of the latching relays are in their normal left positions and all other relays are deenergized. Additional proving runs will be automatically started at the first opening following the first closing of the production meter switch 72 by the production meter cam 71 unless the oil flow through the meters is stopped, or unless either the main power switch 42 or the reset switch 44 is in the OFF position.

An important additional feature of the present invention is the provision of circuitry which permits the second check meter counter 38b to be reset to a zero reading and the second proving run to be rerun, without recourse to a complete resetting of all of the counters, and without disturbing the reading registered on the first check meter counter 38a. Thus, if for any reason it is desired to rerun the second proving run without erasing the reading representing the first run which has been registered on counter 38a, the operator places the switch 46 in its position for resetting both runs and places the switch 44 in its RESET position. In the same manner as previously described, the latter switch is retained in its RESET position only momentarily. The sequence that follows these manipulations is identical to that described above as occurring when the operator turns the switch 44 to its RESET position except as follows:

(a) The contacts A1 and A2 of the switch 46 are opened, breaking the reset circuit to the check meter counter 38a and thereby preventing it from being reset.

(b) The contacts B1 and B2 of the switch 46 also open, breaking the circuit which, as described previously, normally shifts the latching relay 104 to the left position upon momentarily shifting switch 44 to the RESET position. This prevents the latching relay 104 from switching the check meter counting circuit from the second check meter counter 38b to the first check meter counter 38a through contacts A1, A2 and A3 of latching relay 104. Thus, the second proving run can be rerun without disturbing the count which has been registered upon the first check meter counter 38a.

A final feature of the invention is the incorporation in the electrical circuitry of the system of switching means which functions to permit the check meter counting circuit and the production meter counting circuit to be checked against each other to give an indication to the operator if either of these circuits is not operating properly. This switching means includes the multiple-pole test switch 97 which is normally in the position shown in solid lines in FIG. 2. The function of the multiple-pole switch 97 is to permit the production meter counting circuit which is normally connected between the production meter switch 72 and the production meter counter 36 to be connected instead between the switch 88 and the production meter counter 36. As has previously been explained, the switch 88 is positioned adjacent a single-lobed cam 86 which is coaxially secured to the shaft 77 of the check meter 26 so that switch 88 will be closed by the single-lobed cam one time during each revolution of the shaft 77.

With the production meter counter 36 preset to register a count of one, and with the testing switch 97, main power switch 42 and reset switch 44 all turned to the ON position, the automatic proving system of the invention will operate in an identical manner to that which is effected in normal proving operations except that the check meter counters 38a and 38b will count only the pulses resulting from one complete rotation of the peripherally slotted disc 76. The first break following the first make of the switch 88 due to closure by the single-lobed cam 86 will result in the completion of the counting circuit to check meter counter 38a and the next break, or one rotation later, this counting circuit will be broken and a counting circuit will be completed to the second check meter counter 38b following the next opening of the switch 88.

It will be apparent that if the check meter and production meter counting circuits and counters are operating properly, the check meter counters 38a and 38b will simply count the number of slots passing over the photoelectric cell 82 during one rotation of the peripherally slotted disc 76, that is, the number of slots in the disc. If the count on each of the check meter counters 38a and 38b does not correspond to the number of slots 78 in the periphery of the disc 76, there is some malfunction in the production meter counting circuit or in the check meter counting circuits, or in the production and check meter counters themselves. There is, however, one exception to this statement: If the counting circuit to check meter counter 38a or 38b breaks at the instant when a slot 78 is between the light source and the photoelectric cell 82, the counter 38a or 38b, as the case may be, will indicate the number of slots in the disc plus one. This is because, at this time, the coils of the counting solenoids of the check meter counters are energized, and, following their de-energization by the automatic opening of contacts C1 and C2 of latching relay 102 at the end of each proving run, the counters must register one additional count as the spring-loaded pawl indexes one more digit. This one digit overcount may be corrected by so arranging the one lobe cam 86 with respect to the peripherally slotted disc 76 that the test run stops when one of the teeth defining the slots 78 is interposed between the light source 80 and the photoelectric cell 82 instead of one of the slots 78. This causes the test to be terminated at this time with the coils of the counting solenoids of the check meter counters 38a and 38b in their de-energized status.

From the foregoing description, it will be apparent that the present invention provides a novel method and system for automatically measuring and transferring the custody of crude oil from a lease to a receiving pipeline. A minimum of supervision and intervention by operating personnel is required, and the accuracy of the production meter factors obtained is considerably improved by the reduction of the influence of temperature variations to a minimum. The accuracy of the meter factors obtained is also greatly improved as a result of the character of the system which permits two successive proving runs to be made without any alteration during the runs of the rate of flow of oil through either the production meter or the check meter. Moreover, in utilizing the present invention, a considerable saving in time may be realized when, for some reason, it is necessary or desirable to rerun the second of the two proving runs without having to rerun the first proving run.

Changes may be made in the combination and arrangement of parts or elements, as well as steps and procedures heretofore set forth in the specification and shown in the drawings, it being understood that such changes, when effected without departure from the basic principles and concepts disclosed herein, are considered to fall within the spirit and scope of the invention as defined in the following claims.

I claim:
1. Apparatus for proving the accuracy of a positive displacement flow meter comprising:
a second flow meter of known metering accuracy;
means for passing through each of said meters a predetermined volume of liquid as measured by said first-mentioned flow meter;
and means for automatically and independently registering the measurements of the second flow meter at consecutive uniform intervals as indicated by said first-mentioned flow meter during passage of said volume of liquid therethrough, whereby multiple independent provings of the first-mentioned meter may be obtained without stopping the meters.

2. Apparatus as claimed in claim 1 wherein said registering means comprises:
a plurality of proving counters;
and electrical circuit means for automatically consecutively connecting each of said proving counters to said second flow meter during each of said uniform intervals.

3. Apparatus as claimed in claim 2 and further characterized to include:
means for automatically registering said predetermined volume as measured by said first-mentioned meter;
and means for indicating malfunctioning of either of said registering means.

4. Apparatus as claimed in claim 3 wherein said means for registering said predetermined volume as measured by said first-mentioned flow meter comprises:
a flow meter counter;
and electrical circuitry connecting said flow meter counter to said first mentioned flow meter;
and wherein said means for indicating mulfunctioning of either of said registering means comprises:
a switching circuit for electrically disconnecting said flow meter counter and its associated electrical circuitry from said first-mentioned flow meter and connecting said flow meter counter and its associated electrical circuitry to said second flow meter.

5. In a system for the automatic custody transfer of oil from a producing lease to a receiving pipeline:
a production flow meter;
a check flow meter connected in series with said production flow meter between the lease and the pipeline;
a first pulse producing circuit connected to the production meter for periodically producing electrical pulses in response to the flow of oil as measured by said production meter;
a second pulse producing circuit connected to the check meter for periodically producing electrical pulses in response to the flow of oil as measured by said check meter;
a production meter counter connected to said pulse producing circuit for registering a predetermined total count of the pulses produced by said first pulse producing circuit;
means for automatically resetting said production meter counter to a zero reading after said predetermined total count is registered;
first and second check meter counters for registering a total count of pulses produced by said second pulse producing circuit when each of said check meter counters are individually connected to said second pulse producing circuit;
means for electrically connecting said first check meter counter to said second pulse producing circuit when said production meter counter is initially electrically connected to said first pulse producing circuit;
and means for disconnecting said first check meter counter from said second pulse producing circuit, and, simultaneously, connecting said second check meter counter to said second pulse producing circuit when said production meter counter has registered said predetermined total count for the first time after initial energization.

6. A system for the automatic custody transfer of oil as claimed in claim 5 wherein said first pulse producing circuit produces one electrical pulse for each barrel of oil measured by said production meter, and said second pulse producing circuit comprises means for generating at least one thousand electrical pulses for each barrel of oil measured by said check meter.

7. A system for the automatic custody transfer of oil as claimed in claim 5 and characterized further to include:
time delay means for delaying the production of pulses by said first and second pulse producing circuits until said check meter has approached the temperature of the oil flowing therethrough.

8. A system for the automatic custody transfer of oil as claimed in claim 5 and further characterized to include:
means for resetting said second check meter counter to a zero reading simultaneously with the resetting of said production meter counter to a zero reading.

9. A system for the automatic custody transfer of oil as claimed in claim 5 and further characterized to include:
a counter for registering the total quantity of oil which passes through said check meter after said pulse producing circuits commence producing pulses.

10. A system for the automatic custody transfer of oil as claimed in claim 5 and further characterized to include:
a temperature recorder for recording the temperature of the oil passing through said check meter during the operation of said production meter and check meter counters.

11. A system for the automatic custody transfer of oil as claimed in claim 5 and further characterized to include:
a counter for registering the number of total counts which have been collectively registered by said first and second check meter counters whereby the amount which said check meters have been used may be determined on a total run basis.

12. A system for the automatic custody transfer of oil as claimed in claim 5 wherein said second pulse producing circuit comprises:
photoelectric cell means connected to said check meter for generating an electrical pulse each time a predetermined quantity of oil passes through said check meter.

13. A system for the automatic transfer of oil as claimed in claim 8 and further characterized to include:
means for simultaneously resetting said first and second check meter counters to a zero reading when said production meter counter is reset to a zero reading.

14. A system for the automatic custody transfer of oil as claimed in claim 12 wherein said photoelectric cell means comprises:
a peripherally slotted disc connected to said check meter for rotation therewith in response to the flow of oil through said check meter;
a source of electromagnetic energy positioned on one side of said disc adjacent said peripheral slots;
a photoelectric cell positioned on the other side of said disc in alignment with said source and said slots for receiving electromagnetic energy intermittently transmitted from said source through said slots;
and a power amplifier connected to said photoelectric cell for amplifying currents produced by said photoelectric cell.

15. In a system for the automatic custody transfer of oil from a producing lease to a receiving pipeline:
a production flow meter;
a cam carried by the production meter and rotated in timed relation to measurements made by the production meter;
first electrical circuit means;
a first cam actuated switch in said first electrical circuit means positioned for operation by the production meter cam to open and close said first circuit in accordance with the measurements of said production meter;
a check flow meter;
a multi-slotted disc carried by said check meter and rotated in timed relation to measurements made by the check meter;
a source of electromagnetic energy on one side of said disc;
second electrical circuit means;
a photoelectric cell in said second electrical circuit means and positioned on the opposite side of said disc from said source of electromagnetic energy for intermittently receiving energy through said slots from said source in accordance with measurements of the check meter;
first counter means connected in said first circuit means for numerically indicating the measurements of said production meter;
and second counter means connected in said second circuit means for numerically indicating the measurements of said check meter whereby the measurements of said production meter and check meter may be compared by comparison of the numerical readings of said counters.

16. A system for the automatic custody transfer of oil as claimed in claim 15 and further characterized to include:

a cam carried by said check meter and rotated in timed relation to said disc;
a second cam actuated switch positioned for operation by the check meter cam in accordance with the measurements of said check meter;
and a checking switch in said first circuit means for placing said second cam actuated switch in said first circuit means in place of said first cam actuated switch whereby a check of the proper functioning of said first and second circuit means may be obtained.

17. A method of proving a production flow meter with a check flow meter of known accuracy, comprising the steps of:
 (a) connecting the meters in series;
 (b) passing a predetermined volume of liquid through the meters as measured by the production flow meter; and
 (c) registering the measurements of the check flow meter at consecutive uniform intervals as indicated by the production flow meter during passage of the liquid therethrough, whereby multiple provings may be obtained without stopping the meters.

18. The method claimed in claim 17 and further characterized to include the step of registering the measurements by the production flow meter simultaneously with each of the consecutive registrations of said check flow meter measurements during said consecutive uniform intervals.

References Cited by the Examiner
UNITED STATES PATENTS
2,958,218  11/60  Hill _____ 73—3

ISAAC LISANN, *Primary Examiner.*